(12) United States Patent
Schaub

(10) Patent No.: US 11,474,990 B2
(45) Date of Patent: Oct. 18, 2022

(54) PRIORITY QUEUE FOR EXCLUSIVE LOCKS

(71) Applicant: SAP SE, Walldorf (DE)

(72) Inventor: Thomas Schaub, Villeneuve Loubet (FR)

(73) Assignee: SAP SE, Walldorf (DE)

( * ) Notice: Subject to any disclaimer, the term of this patent is extended or adjusted under 35 U.S.C. 154(b) by 383 days.

(21) Appl. No.: 16/521,131

(22) Filed: Jul. 24, 2019

(65) Prior Publication Data
US 2019/0347250 A1 Nov. 14, 2019

Related U.S. Application Data

(63) Continuation of application No. 14/816,588, filed on Aug. 3, 2015, now Pat. No. 10,409,800.

(51) Int. Cl.
*G06F 17/00* (2019.01)
*G06F 7/00* (2006.01)
*G06F 16/23* (2019.01)

(52) U.S. Cl.
CPC ...... *G06F 16/2322* (2019.01); *G06F 16/2343* (2019.01)

(58) Field of Classification Search
CPC .............. G06F 17/30353; G06F 17/30362
USPC ....................................................... 707/704
See application file for complete search history.

(56) References Cited

U.S. PATENT DOCUMENTS

| 5,913,213 A * | 6/1999 | Wikstrom .................. G06F 9/52 707/610 |
| 6,247,025 B1 * | 6/2001 | Bacon ................. G06F 16/2343 707/999.102 |
| 2001/0014905 A1 * | 8/2001 | Onodera .................... G06F 9/52 719/312 |
| 2001/0034753 A1 * | 10/2001 | Hildebrand ............... G06F 9/52 718/107 |
| 2005/0108719 A1 * | 5/2005 | Need ....................... G06F 9/451 718/104 |
| 2006/0167878 A1 * | 7/2006 | Hartman ................ G06Q 30/02 707/999.008 |

* cited by examiner

*Primary Examiner* — Pavan Mamillapalli
(74) *Attorney, Agent, or Firm* — Buckley, Maschoff & Talwalkar LLC

(57) ABSTRACT

A system includes reception of a first request for a lock on a lock object, storage of a first entry associated with the first request and the lock object in a queue, determination of a first queue position associated with the first entry based on a first priority level of the first request and on a priority level of each of a plurality of entries in the queue associated with the lock object, determination of whether a predetermined expiration time associated with the first request has expired, and, if it is determined that the predetermined expiration time has expired, deletion of the first entry from the queue.

20 Claims, 13 Drawing Sheets

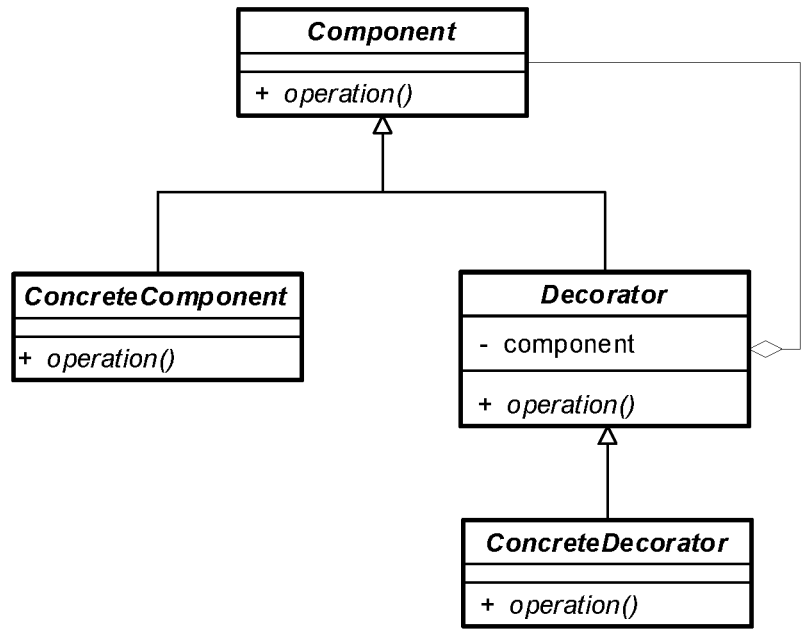
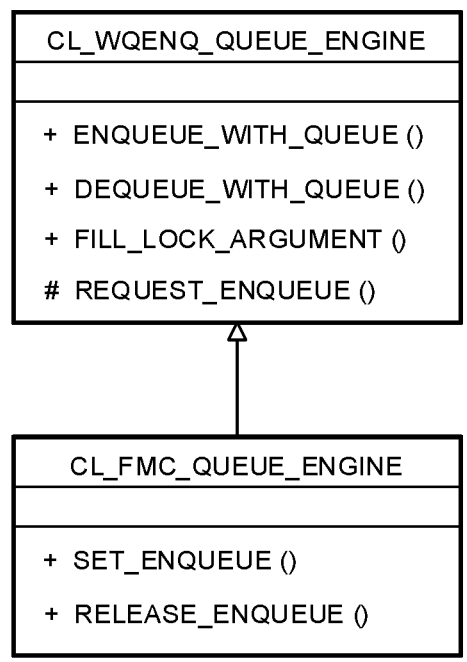
FIG. 4

| Lock Owner | Lock Argument | Queue Position | Observations |
|---|---|---|---|
| #1 | <object 1> | 0 | Lock was set |
| #2 | <object 1> | 1 | Request is wating |
| #3 | <object 2> | 0 | Lock was set |
| #4 | <object 2> | 1 | Request is waiting |
| #5 | <object 2> | 2 | Request is waiting |

*FIG. 7a*

| Lock Owner | Lock Argument | Queue Position | Observations |
|---|---|---|---|
| #1 | <object 1> | 0 | Lock was set |
| #2 | <object 1> | 1 | Request is waiting |
| #6 | <object 1> | 2 | Own request is waiting |
| #3 | <object 2> | 0 | Lock was set |
| #4 | <object 2> | 1 | Request is waiting |
| #5 | <object 2> | 2 | Request is waiting |

*FIG. 7b*

| Lock Owner | Lock Argument | Queue Position | Observations |
|---|---|---|---|
| #2 | <object 1> | 1 | Request is waiting |
| #6 | <object 1> | 2 | Own request is waiting |
| #3 | <object 2> | 0 | Lock was set |
| #4 | <object 2> | 1 | Request is waiting |
| #5 | <object 2> | 2 | Request is waiting |

*FIG. 7c*

| Lock Owner | Lock Argument | Queue Position | Observations |
|---|---|---|---|
| #2 | <object 1> | 0 | Lock was set |
| #6 | <object 1> | 2 | Own request is waiting |
| #3 | <object 2> | 0 | Lock was set |
| #4 | <object 2> | 1 | Request is waiting |
| #5 | <object 2> | 2 | Request is waiting |

*FIG. 7d*

| Lock Owner | Lock Argument | Queue Position | Observations |
|---|---|---|---|
| #2 | <object 1> | 0 | Lock was set |
| #6 | <object 1> | 1 | Own request is waiting |
| #3 | <object 2> | 0 | Lock was set |
| #4 | <object 2> | 1 | Request is waiting |
| #5 | <object 2> | 2 | Request is waiting |

*FIG. 7e*

| Lock Owner | Lock Argument | Queue Position | Observations |
|---|---|---|---|
| #2 | <object 1> | 0 | Lock was set |
| #6 | <object 1> | 1 | Own request is waiting |
| #7 | <object 1> | 2 | Request is waiting |
| #3 | <object 2> | 0 | Lock was set |
| #4 | <object 2> | 1 | Request is waiting |
| #5 | <object 2> | 2 | Request is waiting |

*FIG. 7f*

| Lock Owner | Lock Argument | Queue Position | Observations |
|---|---|---|---|
| #6 | <object 1> | 0 | Own lock was set |
| #7 | <object 1> | 1 | Request is waiting |
| #3 | <object 2> | 0 | Lock was set |
| #4 | <object 2> | 1 | Request is waiting |
| #5 | <object 2> | 2 | Request is waiting |

*FIG. 7g*

| Lock Owner | Lock Argument | Queue Position | Observations |
|---|---|---|---|
| #6 | <object 1> | 0 | Own lock was set |
| #7 | <object 1> | 1 | Request is waiting |
| #3 | <object 2> | 0 | Lock was set |
| #4 | <object 2> | 1 | Request is waiting |
| #5 | <object 2> | 2 | Request is waiting |
| #8 | <generic> | 5 | Request is waiting |

*FIG. 7h*

| Lock Owner | Lock Argument | Queue Position | Observations |
|---|---|---|---|
| #6 | <object 1> | 0 | Own lock was set |
| #7 | <object 1> | 1 | Request is waiting |
| #9 | <object 1> | 6 | Request is waiting |
| #3 | <object 2> | 0 | Lock was set |
| #4 | <object 2> | 1 | Request is waiting |
| #5 | <object 2> | 2 | Request is waiting |
| #8 | <generic> | 5 | Request is waiting |

*FIG. 7i*

| Lock Owner | Lock Argument | Queue Position | Priority | Observations |
|---|---|---|---|---|
| #1 | <object 1> | 0 | 0 | Lock was set |
| #2 | <object 1> | 1 | 0 | Request is waiting |
| #3 | <object 1> | 2 | 0 | Request is waiting |

*FIG. 8a*

| Lock Owner | Lock Argument | Queue Position | Priority | Observations |
|---|---|---|---|---|
| #1 | <object 1> | 0 | 0 | Lock was set |
| #4 | <object 1> | 1 | 1 | Request of higher priority waits |
| #2 | <object 1> | 1 | 0 | Request is waiting |
| #3 | <object 1> | 2 | 0 | Request is waiting |

*FIG. 8b*

| Lock Owner | Lock Argument | Queue Position | Priority | Observations |
|---|---|---|---|---|
| #4 | <object 1> | 0 | 1 | Lock was set |
| #2 | <object 1> | 1 | 0 | Request is waiting |
| #3 | <object 1> | 2 | 0 | Request is waiting |

*FIG. 8c*

| Lock Owner | Lock Argument | Queue Position | Observations |
|---|---|---|---|
| #1 | <object 1> | 0 | Lock was set |
| #2 | <object 1> | 1 | Request is waiting |
| #3 | <object 1> | 2 | Request is waiting |

*FIG. 10a*

| Lock Owner | Lock Argument | Queue Position | Observations |
|---|---|---|---|
| #1 | <object 1> | 0 | Lock was set |
| #2 | <object 1> | 1 | Request is waiting |
| #3 | <object 1> | 2 | Request is waiting |
| #4 | <object 1> | 3 | Long-term request is waiting |

*FIG. 10b*

| Lock Owner | Lock Argument | Queue Position | Observations |
|---|---|---|---|
| #2 | <object 1> | 0 | Lock was set |
| #3 | <object 1> | 1 | Request is waiting |
| #4 | <object 1> | 2 | Long-term request is waiting |

*FIG. 10c*

| Lock Owner | Lock Argument | Queue Position | Observations |
|---|---|---|---|
| #3 | <object 1> | 0 | Lock was set |
| #4 | <object 1> | 1 | Long-term request is waiting |

*FIG. 10d*

| Lock Owner | Lock Argument | Queue Position | Observations |
|---|---|---|---|
| #3 | <object 1> | 0 | Lock was set |
| #4 | <object 1> | 1 | Long-term request is waiting |
| #5 | <object 1> | 2 | Request is waiting |
| #6 | <object 1> | 3 | Request is waiting |

*FIG. 10e*

| Lock Owner | Lock Argument | Queue Position | Observations |
|---|---|---|---|
| #4 | <object 1> | 0 | Long-term request tries to set lock |
| #5 | <object 1> | 1 | Request is waiting |
| #6 | <object 1> | 2 | Request is waiting |

*FIG. 10f*

| Lock Owner | Lock Argument | Queue Position | Observations |
|---|---|---|---|
| #5 | <object 1> | 0 | Request tries to set lock |
| #6 | <object 1> | 1 | Request is waiting |

*FIG. 10g*

| Lock Owner | Lock Argument | Queue Position | Observations |
|---|---|---|---|
| #6 | <object 1> | 0 | Request tries to set lock |

*FIG. 10h*

PRIORITY QUEUE FOR EXCLUSIVE LOCKS

CROSS-REFERENCE TO RELATED APPLICATION(S)

This application is a continuation of U.S. patent application Ser. No. 14/816,588, filed on Aug. 3, 2015, in the United States Patent and Trademark Office, the entire disclosure of which is incorporated herein for all purposes.

BACKGROUND

Database applications typically provide multiple users with parallel access to stored data. A process associated with one user may request a temporary application lock on a database object in order to answer a business question, while simultaneously preventing other concurrent processes to access or change the data underlying the answer. For example, a first process may request an application lock on data representing stock availability in a warehouse, or on data representing remaining budget for a project. While the first process holds the lock, a second process requesting the same lock receives an error message indicating that another process currently holds the lock.

In some systems, a lock request may include a Wait parameter. The Wait parameter causes a failed lock request to be repeated after a fixed waiting time (e.g., 1 second). If the lock request fails after each of a specific number of iterations (e.g., 5), the above-mentioned error message is issued. However, if a lock becomes available while one request from a first process is waiting and a new request from a second process is received, the new request is granted, even though the new request is more recent than the request from the first process.

BRIEF DESCRIPTION OF THE DRAWINGS

FIG. 4 illustrates a Decorator design pattern and a class framework according to some embodiments.

FIGS. 7a through 7i comprise tabular representations of portions of a queue table according to some embodiments.

FIGS. 8a through 8c comprise tabular representations of portions of a queue table according to some embodiments.

FIGS. 10a through 10h comprise tabular representations of portions of a queue table according to some embodiments.

DETAILED DESCRIPTION

The following description is provided to enable any person in the art to make and use the described embodiments. Various modifications, however, will remain readily apparent to those in the art.

Figure 1:
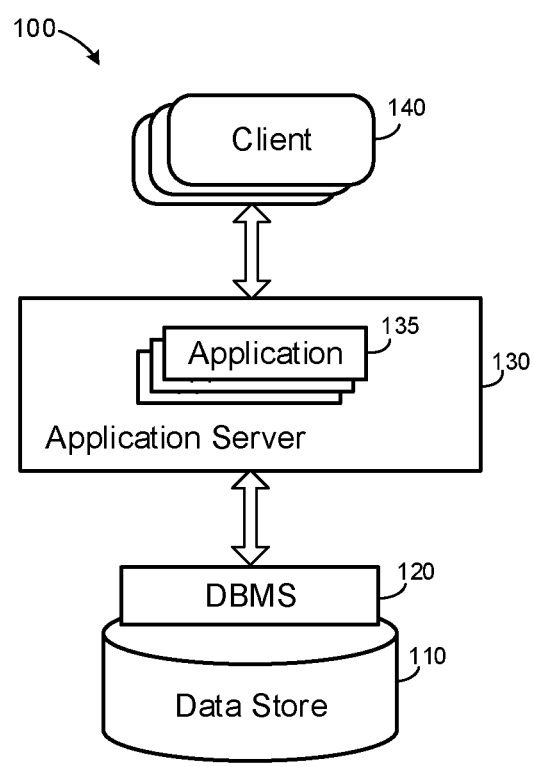
FIG. 1 is a block diagram of a database architecture according to some embodiments.

FIG. 1 is a block diagram of database architecture 100 according to some embodiments. Embodiments are not limited to architecture 100 or to a database architecture.

Architecture 100 includes data store 110, database management system (DBMS) 120, application server 130, applications 135 and clients 140. Generally, applications 135 executing within application server 130 receive queries from clients 140 and provides results to clients 140 based on data of data store 110.

More specifically, application server 130 executes and provides services to applications 135. Applications 135 may comprise server-side executable program code (e.g., compiled code, scripts, etc.) which provide functionality to clients 140 by providing user interfaces to clients 140, receiving requests from clients 140, retrieving data from data store 110 based on the requests, processing the data received from data store 110, and providing the processed data to clients 140. Applications 135 may be made available for execution by application server 130 via registration and/or other procedures which are known in the art.

Application server 130 provides any suitable interfaces through which clients 140 may communicate with applications 135 executing on application server 130. For example, application server 130 may include a HyperText Transfer Protocol (HTTP) interface supporting a transient request/response protocol over Transmission Control Protocol (TCP), and/or a WebSocket interface supporting non-transient full-duplex communications between application server 130 and any clients 140 which implement the WebSocket protocol over a single TCP connection.

One or more applications 135 executing on server 130 may communicate with DBMS 120 using database management interfaces such as, but not limited to, Open Database Connectivity (ODBC) and Java Database Connectivity (JDBC) interfaces. These types of applications 235 may use Structured Query Language (SQL) to manage and query data stored in data store 110.

DBMS 120 serves requests to retrieve and/or modify data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from or closely integrated with DBMS 120. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for Open Data Protocol, server-side JavaScript execution and access to SQL and SQLScript.

Application server 130 may provide application services (e.g., via functional libraries) using which applications 135 may manage and query the data of data store 110. The application services can be used to expose the database data model, with its tables, views and database procedures, to clients. In addition to exposing the data model, application server 130 may host system services such as a search service.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Each of clients 140 may comprise one or more devices executing program code of a software application for presenting user interfaces to allow interaction with application server 130. The user interfaces may comprise user interfaces suited for reporting, data analysis, and/or any other functions based on the data of data store 110.

Presentation of a user interface as described herein may comprise any degree or type of rendering, depending on the type of user interface code generated by application server 130. For example, a client 140 may execute a Web Browser to request and receive a Web page (e.g., in HTML format) from application server 130 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine.

Figure 2:
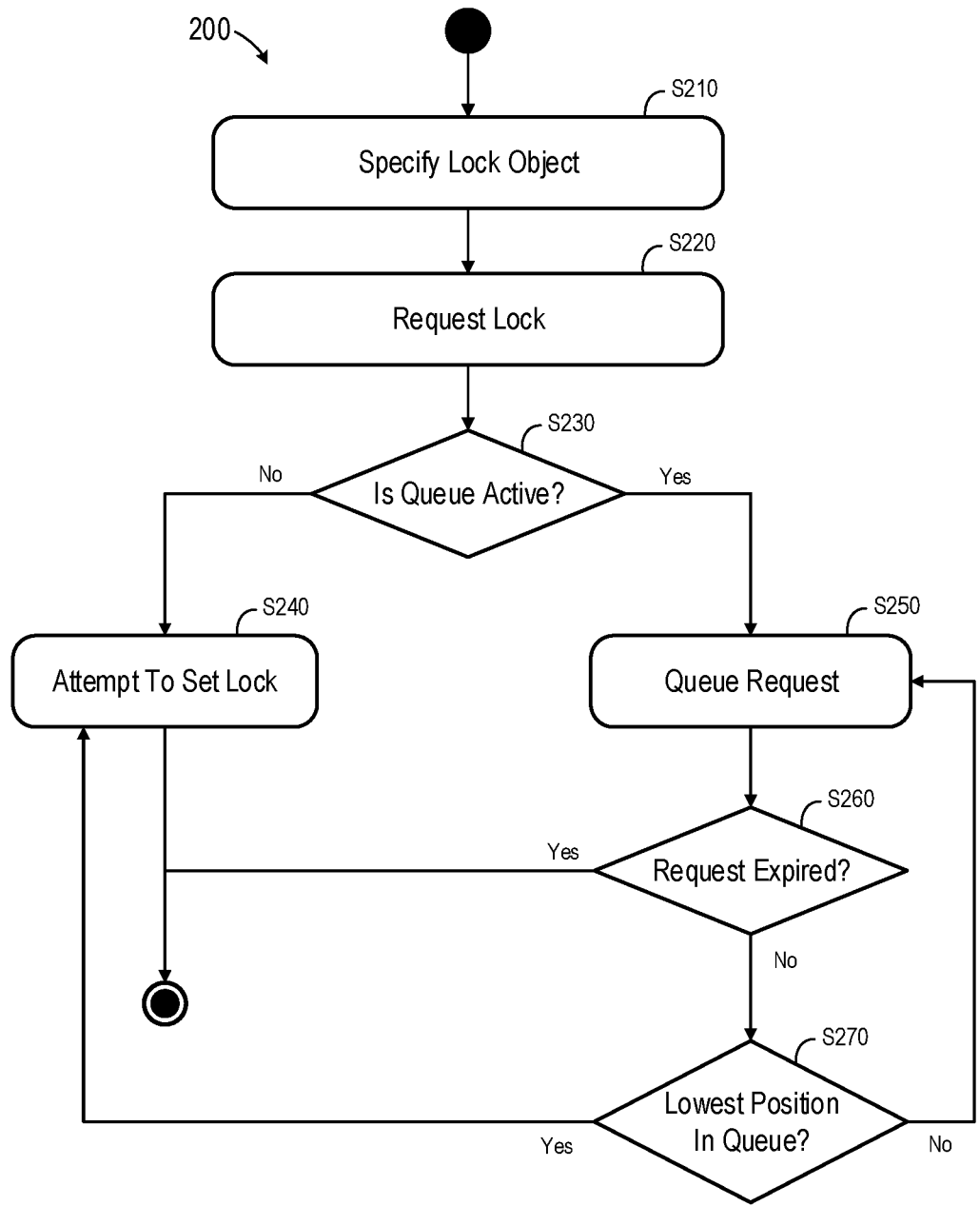
FIG. 2 is a flow diagram of a process according to some embodiments.

FIG. 2 comprises a flow diagram of process 200 according to some embodiments. Process 200 may provide expiration of long-pending locks and some implementations may provide for locks of differing priority and/or pendency as described below.

In some embodiments, various hardware elements of architecture 100 (e.g., one or more processors) execute program code to perform process 200. Process 200 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 200 will now be described generally, with specific examples to follow. Initially, at S210, a lock object is specified. The lock object may be any unit or set of data for which a lock is desired. An application may define the lock object using a technical name or any other identifier that is or becomes known.

A lock on the lock object is requested at S220. The lock may be requested by calling a particular method, with an identifier of the lock object as an argument of the method. The method may accept additional information, within the one argument or as separate arguments, as will be described below.

At S230, it is determined whether a queue associated with the lock object is active. S230 may be performed by application server 130 or DBMS 120 according to some embodiments. If such a queue is not active, it is assumed that no other process holds the lock or is waiting for the lock. Accordingly, an attempt to set the lock is performed at S240. If the attempt is successful, the lock is set (i.e., granted to the requesting process) at S240. If a queueing process for lock requests is activated, a queue table may also be updated to indicate that the lock is possessed by the process.

If the queue is determined to be active at S230, the request is queued at S250. Generally, S250 involves managing the queue, and such management may be based on a priority level of the request in some embodiments. Specific processes underlying S250 according to some embodiments will be described below.

If it is determined at S260 that the request has expired (based on a specified waiting time), an error is returned. If not, it is determined at S270 whether the request has reached a lowest position in the queue. If not, flow returns to S250 to continue management of the queue. If it is determined that the request has reached a lowest position in the queue, an attempt to set the lock is executed at S240 as described above.

Determination of request expiration at S260 may address several scenarios. For example, if too many lock requests for a same lock arrive at the same time, the queue position of a specific lock request in the priority queue can become so high and the total waiting time for this request would become so long that at some point it will no longer be reasonable for this lock request to wait. Instead, an error message is issued after some maximum waiting time has expired.

Also, if a requesting application aborts or if a user cancels a process, after the system has added a corresponding lock request to the priority queue, the lock request may remain in the queue table. If such a request is not removed, all other lock requests having a higher queue position would necessarily wait interminably.

Such expired lock requests may be removed by a regularly-executed background job. Expired lock requests may also be removed by method REQUEST_ENQUEUE, as will be described with respect to FIG. 5.

Figure 3:
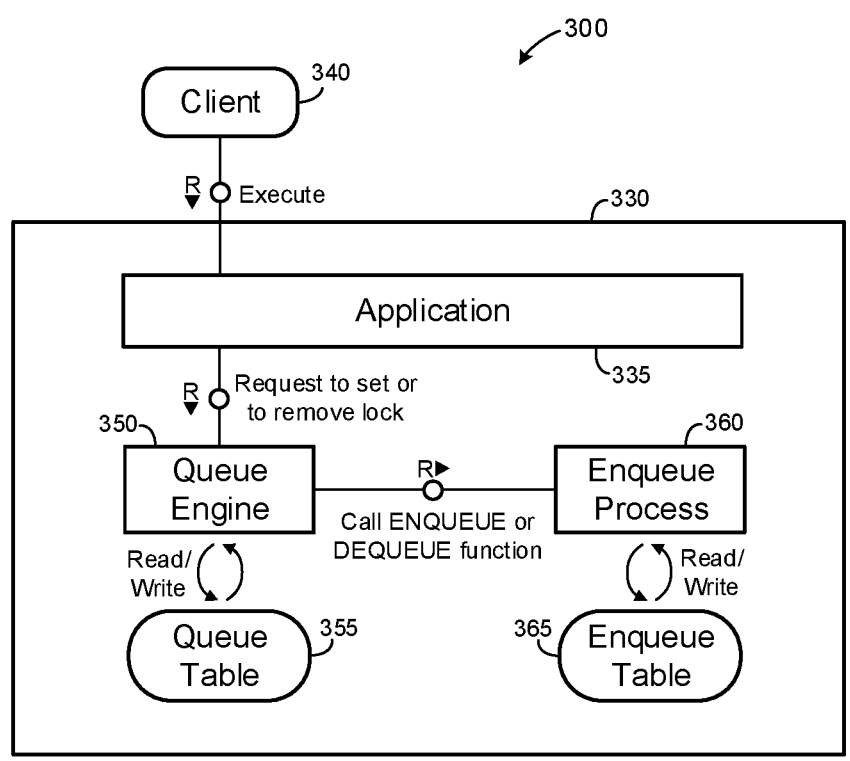
FIG. 3 is a block diagram of a runtime system according to some embodiments.

FIG. 3 is a block diagram of a system according to some embodiments. System 300 includes client 340 and backend 330. Backend 330 may comprise an application server, a database management system, or elements of both. Queue engine 350 may be considered a "wrapper" interface between application 335 requesting a lock and the known ENQUEUE/DEQUEUE interfaces 360. The wrapper interface adds queue functionality described herein to the existing ENQUEUE/DEQUEUE interfaces.

FIG. 4 is a diagram describing the functionality according to some embodiments using the known "Decorator" design pattern. The super-class CL_WQENQ_QUEUE_ENGINE serves as a Decorator class (or interface). The super-class therefore defines generic parts of the queuing process according to some embodiments, such as the public methods ENQUEUE_WITH_QUEUE and DEQUEUE_WITH_QUEUE, which are used with a public method such as FILL_LOCK_ARGUMENT to set or release application locks. The super-class CL_WQENQ_QUEUE_ENGINE also provides the protected method REQUEST_ENQUEUE, which may implement most of the program logic for priority queue handling as will be described below.

CL_WQENQ_QUEUE_ENGINE contains two protected methods SET_ENQUEUE and RELEASE_ENQUEUE, which may be implemented in an application-specific sub-class. These method redefinitions contain the application-specific calls of the corresponding ENQUEUE or DEQUEUE function modules.

As an example, for an application named Funds Management Control ("FM C"), the "ConcreteDecorator" class may be realized by class CL_FMC_QUEUE_ENGINE, which calls the ENQUEUE and DEQUEUE function modules ENQUEUE_E_EFMCT and DEQUEUE_E_EFMACT of the application by redefining the methods SET_ENQUEUE and RELEASE_ENQUEUE. The "ConcreteComponent" class is represented by the application-specific ENQUEUE and DEQUEUE function modules (i.e., ENQUEUE_E_EFMCT and DEQUEUE_E_EFMCT in the case of FM C), and the "Component" class is realized by new function modules (or methods), which encapsulate the call of methods ENQUEUE_WITH_QUEUE and DEQUEUE_WITH_QUEUE from the Decorator class CL_WQENQ_QUEUE_ENGINE.

According to some embodiments, application 335 implements a sub-class of super-class CL_WQENQ_QUEUE_ENGINE. This sub-class is an engine and is instantiated as singleton. To instantiate the sub-class, application 335 may call the static factory method GET_INSTANCE of the super-class, by indicating the name of the sub-class and the name of the lock table of the desired lock object.

Locks which are associated with a priority queue are set and released by calling the public methods ENQUEUE_WITH_QUEUE and DEQUEUE_WITH_QUEUE. To keep the interface of these two methods as generic as possible, the public methods use a generic lock argument. Therefore, before calling ENQUEUE_WITH_QUEUE and DEQUEUE_WITH_QUEUE, the lock argument is first built, for example, by concatenating all field values of the requested lock. The public method FILL_LOCK_ARGUMENT offers this functionality. However, the sub-class may redefine this method or provide a separate "FILL" method with an application-specific method interface.

To interpret the generic lock argument, a corresponding "READ" method is used (e.g., the generic method READ_LOCK_ARGUMENT of class CL_WQENQ_QUEUE_ENGINE). This "READ" method is called in the redefinitions of the abstract methods SET_ENQUEUE and RELEASE_ENQUEUE, which also use the generic lock argument mentioned above as a method parameter. The central protected routine REQUEST_ENQUEUE of the priority queue framework is called inside the public method ENQUEUE_WITH_QUEUE.

Figure 5:
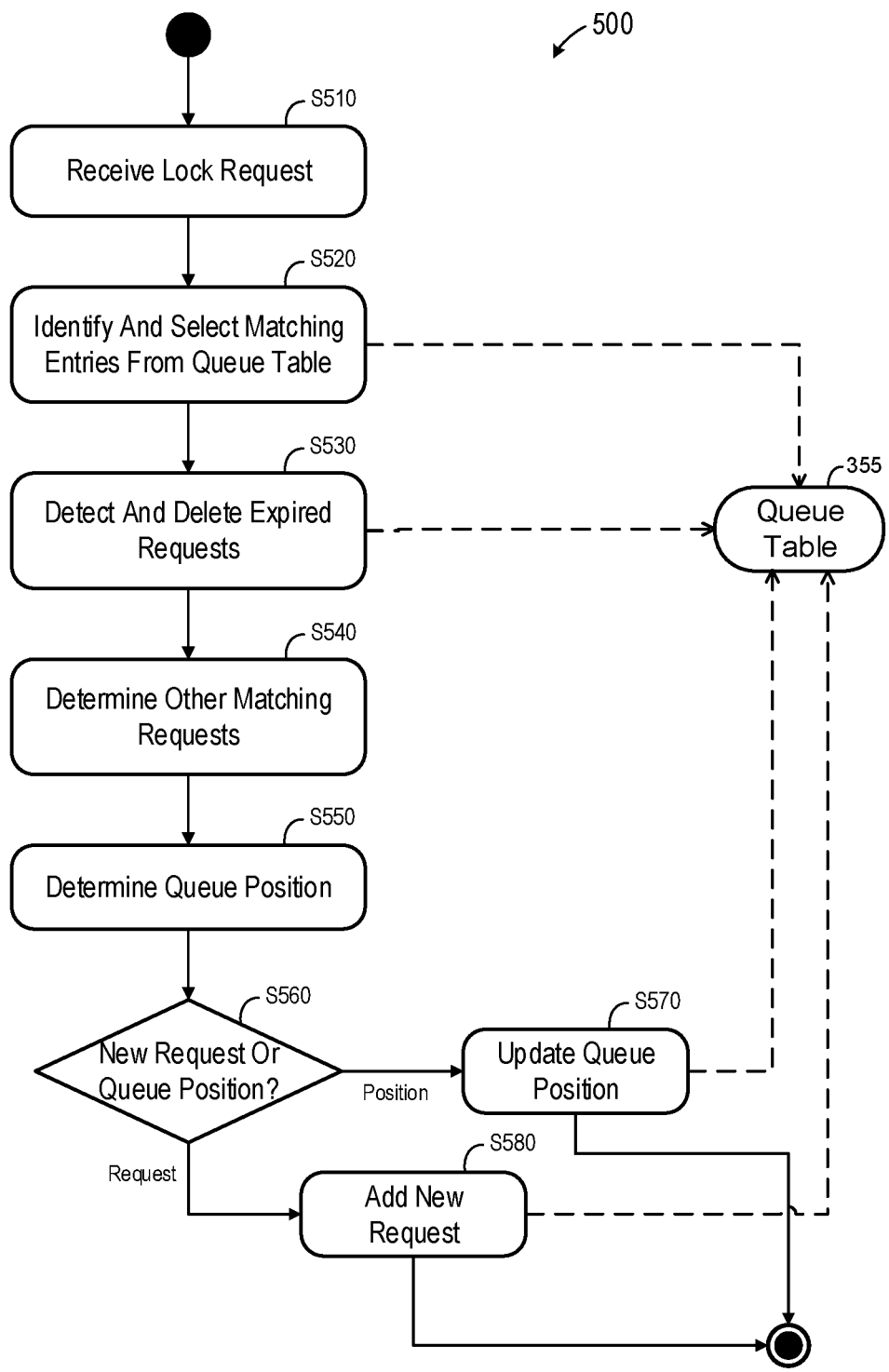
FIG. 5 is a flow diagram of a process according to some embodiments.

FIG. 5 is a flow diagram of process 500 to implement method REQUEST_ENQUEUE (i.e., S250 of FIG. 2) according to some embodiments. Initially, a lock request is received at method REQUEST_ENQUEUE at S510. Entries of the queue table which match the lock request are identified and selected from the queue table at S520.

Prior to this selection, a database lock is set on table WQENQ_QUEUE_TAB for the lock table name of the desired lock object. The database lock is set in order to guarantee that the current process is the only one to evaluate the queue table. This database lock is kept until the end of method REQUEST_ENQUEUE, at which point the database lock is released by a database COMMIT statement. In the interim, no other concurrent process may evaluate or change the entries of the queue table.

Generic lock requests may be taken into consideration when identifying matching entries from the queue table at S520. Treatment of generic locks according to some embodiments is described below.

Expired lock requests are detected at S530 and are subscribed for deletion from the queue table. According to some embodiments, if the queue position of a lock request is greater than zero (i.e., no lock has been set yet), the request expires when it is older than a specified Maximum Waiting Time. The Maximum Waiting Time (e.g., between 10 and 30 seconds) can be defined as process parameter when activating the priority queue (field MAX_TIME of the activation table WQENQ_QUEUE_ACT).

If the queue position is 0, it is assumed that a lock has been set successfully. The system therefore waits a bit longer, taking into account the duration of this lock. Such a lock is considered expired if it has been pending longer than the sum of the Maximum Waiting Time and a specified Additional Residence Time. The Additional Residence Time (e.g., 1 to 5 seconds) can also be defined during the activation of the waiting queue (field ADD_ENQ_TIME of table WQENQ_QUEUE_ACT). The Additional Residence Time may be longer than the expected maximum duration of a temporary exclusive lock.

Figure 6:
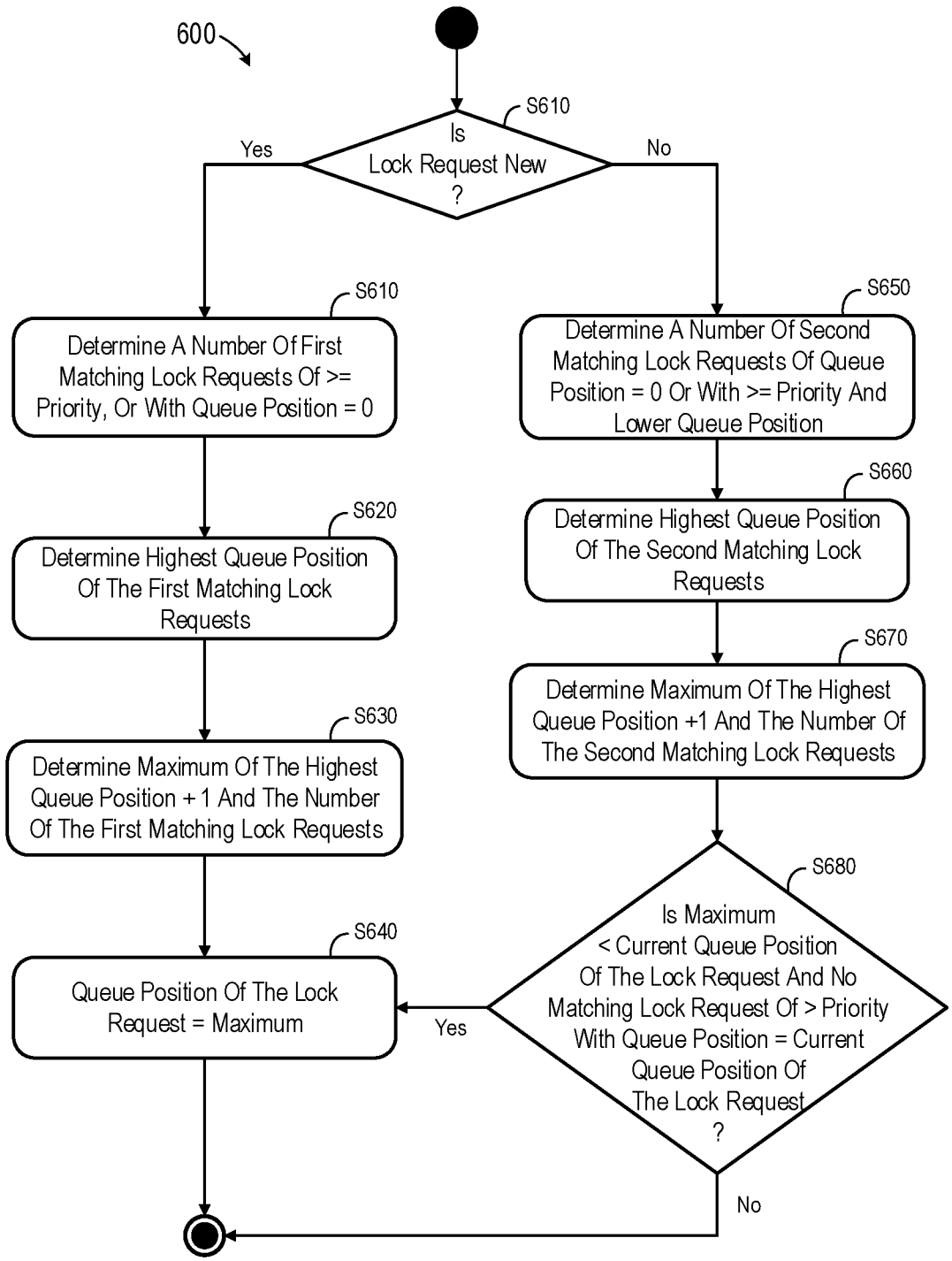
FIG. 6 is a flow diagram of a process according to some embodiments.

From the lock requests selected at S520, all remaining (i.e., non-expired) lock requests are determined at S540. The queue position of the lock request received at S510 is determined at S540 based on the remaining lock requests. FIG. 6 is a flowchart of process 600 to determine the queue position at S550 according to some embodiments.

At S610, it is determined whether the lock request is new. That is, S610 determines whether the method REQUEST_ENQUEUE is being executed for the first time for this lock request. If the lock request is new, then, of the matching requests determined at S540, the total number (NUM) of matching lock requests of the same or of higher priority and/or with queue position zero (irrespective of their priority level) is determined. Next, at S620, the highest queue position (HIGH) of these lock requests is determined.

At S630, the maximum of NUM and (HIGH+1) is determined. If no other matching lock requests are determined at S540, then the maximum is determined to be 0. The queue position for the new lock request is set to this maximum at S640 and flow returns to S560.

If it is determined at S610 that the lock request is not new (i.e., the method REQUEST_ENQUEUE has already been executed for the same lock request), then, of the matching lock requests determined at S540, the total number (NUM) of matching lock requests of the same or higher priority, but with lower queue position, and/or with queue position zero, irrespective of the priority, is determined at S650. A highest queue position (HIGH) of these lock requests is then determined at S660.

At S670, the maximum of NUM and (HIGH+1) is determined. Again, if no other matching lock requests are determined at S540, then the maximum is determined to be 0.

Next, at S680, it is determined whether the maximum determined at S670 is less than the current queue position of the existing lock request and if there is no another matching lock request of higher priority which has a queue position equal to the current queue position of the existing lock request. If these conditions are true, the queue position for the new lock request is set to this maximum at S640 and flow returns to S560. If not, the current queue position of the existing lock request is unchanged and flow returns to S560.

The conditions of S680 ensure that a queue position of a lock request does not increase, and that a queue position of a lock request with higher priority decreases before the queue position of another lock request, which has the same queue position, but a lower priority.

Returning to S560 of process 500, it is determined whether the queue position determined at S550 is a new queue position or whether the lock request is new. If the position is new, the position in the queue table is updated at S570. If the lock request is new, the new request is added to the queue table at S580. Expired entries may also be deleted at this time.

If no other matching lock requests are found for a new lock request, then the process quits the loop at S270 with queue position 0 and reaches S240. If the queue position is not 0, flow continues to cycle through the loop consisting of S250, S260, S270 (i.e., process 500), until either queue position 0 is reached or until the request has expired and the loop exits at S260.

Returning to FIG. 2, the loop processing including the method REQUEST_ENQUEUE continues (i.e., cycling between S250, S260 and S270) until the present lock request has expired or the queue position of the lock request is 0. When a lock request leaves method REQUEST_ENQUEUE with a queue position of 0, the method SET_ENQUEUE is called. This method may be pseudo-abstract in class CL_WQENQ_QUEUE_ENGINE and is redefined ("implemented") in the application-specific sub-class, where the corresponding ENQUEUE function module is called, but without using the Wait parameter, if the priority queue is active. The in-built waiting mechanism of the ENQUEUE framework is not used in this case, since it is replaced by the priority queue processing described herein. If the priority queue is not active (i.e., the determination at S230 is negative), then SET_ENQUEUE may call the ENQUEUE function module from the application and set the Wait parameter to 'X'.

The lock request with queue position 0 may be kept in the queue table until the lock is released again by calling the public method DEQUEUE_WITH_QUEUE. This method may remove the lock request from the queue table and also call the DEQUEUE function module via the application-specific implementation of the method RELEASE_ENQUEUE.

Returning to the subject of generic lock requests, generic lock requests include lock arguments which contain one or more 'wild card' characters. A generic lock is set if it is not necessary that all fields of the lock object contain some specific value, but only that some characteristic 'key' fields (e.g., ledger number, fiscal year) contain some specific value. Other fields are often locked in a generic way, meaning that all possible values should be locked (e.g., all periods of the fiscal year).

Referring to process 500, the following process may be used to determine all matching priority queue entries for a given incoming generic lock request. First, all positions of the lock argument of the Incoming Lock Request (ILR) which contain a 'wild card' are determined. Next, the same operation is performed for the lock argument of any Potentially-Matching Lock Request (PMLR) from the priority queue to determine the 'wild card' positions in the lock argument of the PMLR. Then the characters of a local copy of the lock argument of the ILR are replaced with 'wild cards' at the determined positions of the lock argument of the PMLR. Conversely, the characters of a local copy of the lock argument of the PMLR are replaced with 'wild cards' at the determined positions of the lock argument of the ILR. If the local copies are identical, the lock argument of the potentially-matching lock request is determined to match the lock argument of the incoming new lock request. The foregoing process is repeated for each lock request of the priority queue table which includes a potentially-matching lock argument.

To provide an example, it will be assumed that a new incoming lock request includes the lock argument 9H2014###OBJECT1, having a 'wild card' '#' at positions 7 to 9. Potentially-matching lock arguments of the priority queue table are: 9H20140OOOBJECT1; 9H2014000########; and 9H####OOOOBJECT2.

The lock argument 9H20140OOOBJECT1 has no 'wild cards', so the argument of the new incoming lock request does not need to be transformed, and remains 9H2014###OBJECT1 (i.e., 'string 1'). The positions 7 to 9 of the lock argument 9H20140OOOBJECT1 are converted, which results in 9H2014###OBJECT1 (i.e., 'string 2'). 'String 1' and 'string 2' are identical, so the lock argument 9H20140OOOBJECT1 is determined to match the lock argument 9H2014###OBJECT1 of the incoming request.

The second lock argument 9H2014000########has 'wild cards' at positions 10 to 16. The lock argument of the incoming request is therefore converted from 9H2014###OBJECT1 to 9H2014########### (i.e., 'string 3'). The second lock argument is also converted at positions 7 to 9, resulting in 9H2014########### (i.e., 'string 4'). Again, 'string 3' and 'string 4' are identical, and the lock argument 99H2014000########is determined to match the lock argument 9H2014###OBJECT1 of the incoming request.

The last lock argument includes 'wild cards' at positions 3 to 6. The argument 9H2014###OBJECT1 is converted to 9H#######OBJECT1 (i.e., 'string 5') and the last lock argument from 9H####OOOOBJECT2 to 9H#######OBJECT2 (i.e., 'string 6'). Since 'string 5' and 'string 6' are different, it is determined that the lock argument 9H####OOOOBJECT2 does not match the argument 9H2014###OBJECT1 of the incoming request.

The methods of super-class CL_WQENQ_QUEUE_ENGINE may use a character-wise processing of 'wild cards', as described above. This default character-wise processing may be replaced by an application-specific 'field-wise' processing, where a 'wild card' character may only be present at a first position of each lock field.

FIGS. 7a through 7i illustrate an example of the algorithm of FIG. 6 according to some embodiments. FIG. 7a illustrates a priority queue table including several lock requests. All lock requests of this example will be considered to have the same priority. The listed lock owners are from concurrent processes. A queue position of 0 indicates that the corresponding lock is set, while a queue position other than 0 indicates that the corresponding lock request is waiting.

It will be assumed that another process (lock owner #6) requests a lock with argument <object 1>. With reference to S610 and S620, the number NUM of all other matching lock requests (i.e., associated with <object 1>) is 2 and the highest queue position HIGH of the other matching requests is 1. Because both NUM and (HIGH+1) are equal to 2, the queue position of the lock request is determined at S640 to be 2.

A corresponding new entry is added in the priority queue table at S580. FIG. 7b illustrates, in bold, such a new entry associated with lock owner #6, lock argument <object 1> and queue position 2.

It is now assumed that the process of lock owner #1 releases the lock and removes the corresponding entry from the priority queue table, resulting in the table of FIG. 7c. In response, new queue positions are determined by re-executing process 600 for each lock request.

For example, considering the process of lock owner #2, it is determined at S650 that there are no other matching lock requests with queue position lower than 1. Therefore, NUM is determined to be 0 and no highest queue position is determined at S660. The new queue position of this request is therefore determined as 0, indicating that the lock can be set. FIG. 7d illustrates the updated corresponding queue table entry, in bold.

The new queue position for lock owner #6 is therefore 1, as determined as maximum of NUM=(HIGH+1)=1. The result is shown in the updated table of FIG. 7e.

In the meantime another process (i.e., of lock owner #7) requests a lock with argument <object 1>. FIG. 7f illustrates entry of this request into the queue table according to S610-S640 and S580. Next, after the process of lock owner #2 releases its lock, the corresponding priority queue entry is deleted and the lock request of lock owner #6 moves to queue position 0 as described above. FIG. 7g shows the lock request of lock owner #6 having received the lock.

A generic lock request then arrives, which matches both lock arguments <object 1> and <object 2>. The number of matching other lock requests (NUM) is 5 and the highest queue position of matching lock requests (HIGH) is 2. Accordingly, the maximum of NUM (5) and HIGH+1 (3) is 5. This queue position is reflected in the added entry of the priority queue table shown in FIG. 7h.

Any subsequent lock request which matches the generic lock request will have a queue position greater than 5, even though no lock request are assigned queue positions 3 or 4. Assuming that such a subsequent lock request is received, NUM=6 and HIGH=5, resulting in the new entry for lock owner #9 shown in FIG. 7i. The generic lock of lock owner #8 may be set only when all lock requests with lower queue positions have been processed (e.g., the requests of lock owners #3, #4, #5, #6, and #7).

FIG. 8a through 8c illustrate an example in which a lock request is received having a higher priority than other lock requests of the priority queue table. It will be assumed that FIG. 8a shows the priority queue table prior to receipt of this lock request, and that the entries shown in FIG. 8a all have the same priority (i.e., 0).

Another process (with lock owner #4) issues a lock request with a higher priority (i.e., 1). This lock request does not cause a lock to be set if another concurring process holds the lock with queue position 0, even if the held lock has a lower priority. However, the lock request will be queued immediately behind the request holding the lock and in front of all other lock requests with lower priority. Even though the queue position 1 is already associated with another request, the new lock request will also take this queue position, as shown in FIG. 8b.

After the process with lock owner #1 removes its lock, thereby also removing its lock request from the priority queue, the priority queue will include two lock requests with the same queue position (i.e., 1). The request with the higher priority passes to a lower queue position. Since this lower position is the lowest queue position 0, the new request sets its lock as shown in FIG. 8c.

As shown in this example, a lock request with higher priority receives a lock more quickly than other requests having lower priority, even though the other requests may have been received before the lock request with higher priority was received.

According to the above, an application which uses the priority queue mechanism sets a lock for a short period of time. The corresponding priority queue entry is kept in the queue table until the lock is removed. However, certain processes may need to set a lock for a longer duration, thus forcing all other processes to wait until the process (e.g., a reconstruction or reconciliation process) has finished. In this case, the other processes will wait until they reach the maximum waiting time (MAX_TIME) at which their lock request expires.

Some embodiments use "long-term locks" to avoid this waiting time. When a long-term lock is set, the corresponding priority queue entry (with queue position 0) is not kept until the lock is released via the DEQUEUE method, but is removed from the queue table as soon as the lock is set.

Figure 9:
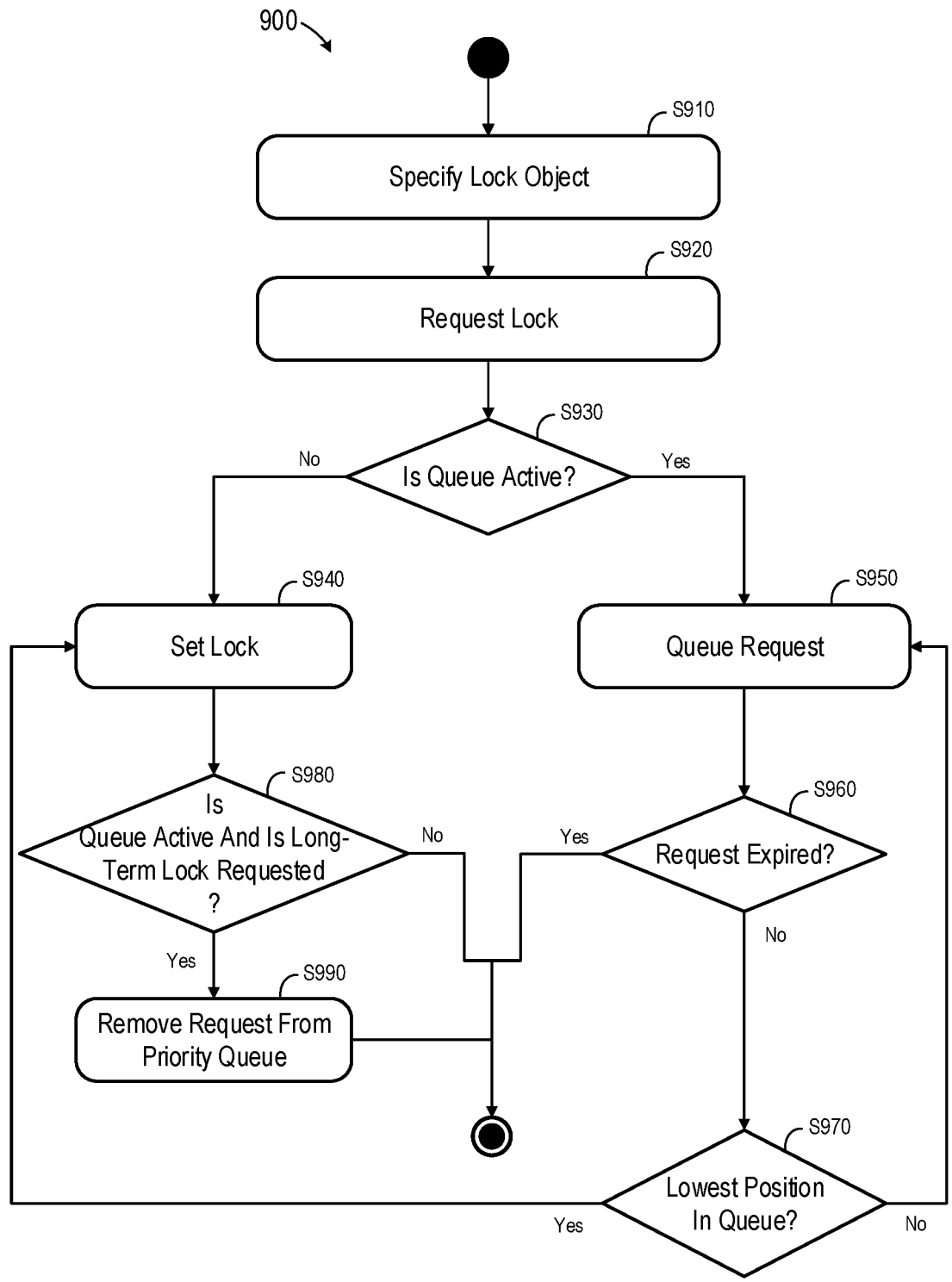
FIG. 9 is a flow diagram of a process according to some embodiments.

FIG. 9 is a flow diagram of process 900 to accommodate long-term locks according to some embodiments. Process 900 is similar to process 200, with the exception of S980 and S990. As shown, when flow reaches S940 from S970 after a lock request has reached the lowest position in the queue, it is then determined whether the lock request is a long-term lock. If so, the lock request is removed from the priority queue at S990.

As a result, any other incoming lock request will determine that queue position 0 is free and try to set a lock. This will fail, eliminating any further delay.

FIGS. 10a through 10h illustrate an example of processing a long-term lock request according to some embodiments. It will be assumed that FIG. 10a shows the priority queue table prior to receipt of a long-term lock request.

It will then be assumed that another process of lock owner #4 wants to set a long-term lock. This process may be, e.g., a mass process which will rebuild some data or documents. Normally such a mass process sets a generic lock, but for simplicity it is assumed that this long-term lock is requested for the same lock argument <object 1> as the other entries in the priority queue, as shown in FIG. 10b.

The process of lock owner #1 then performs a DEQUEUE and removes its entry from the priority queue. The request with queue position 1 passes to position 0 and sets the lock. The queue positions of the other requests are adjusted accordingly as shown in FIG. 10c. FIG. 10d illustrates the process of lock owner #2 releasing its lock and removing its entry from the priority queue.

Two other processes then request a lock for <object 1> as shown in FIG. 10e. When the process of lock owner #3 releases its lock, the priority queue entry for lock owner #3 is removed and the queue positions of the other requests are adjusted as shown in FIG. 10f. The request with long-term lock can now set its lock (i.e., with ENQUEUE). The associated entry is then deleted from the priority queue and the queue positions for the other entries are adjusted correspondingly as shown in FIG. 10g.

The process of lock owner #5 now tries to set its lock. This will cause a lock collision because the process with the long-term lock (of lock owner #4) still holds its lock. Occurrence of this error will cause removal of the offending lock request from the priority queue. FIG. 10h shows the priority queue after adjusting the queue position for the other remaining process.

The same collision error will then occur with respect to the process of lock owner #6. The process will try to set its lock due to its queue position of 0, but will fail because the process of lock owner #4 still holds the exclusive lock. The error will cause the last entry to be deleted from the priority queue table.

All lock requests which are subsequently received into the priority queue after the long-term request are immediately rejected as long as the long-term lock is set.

Figure 11:
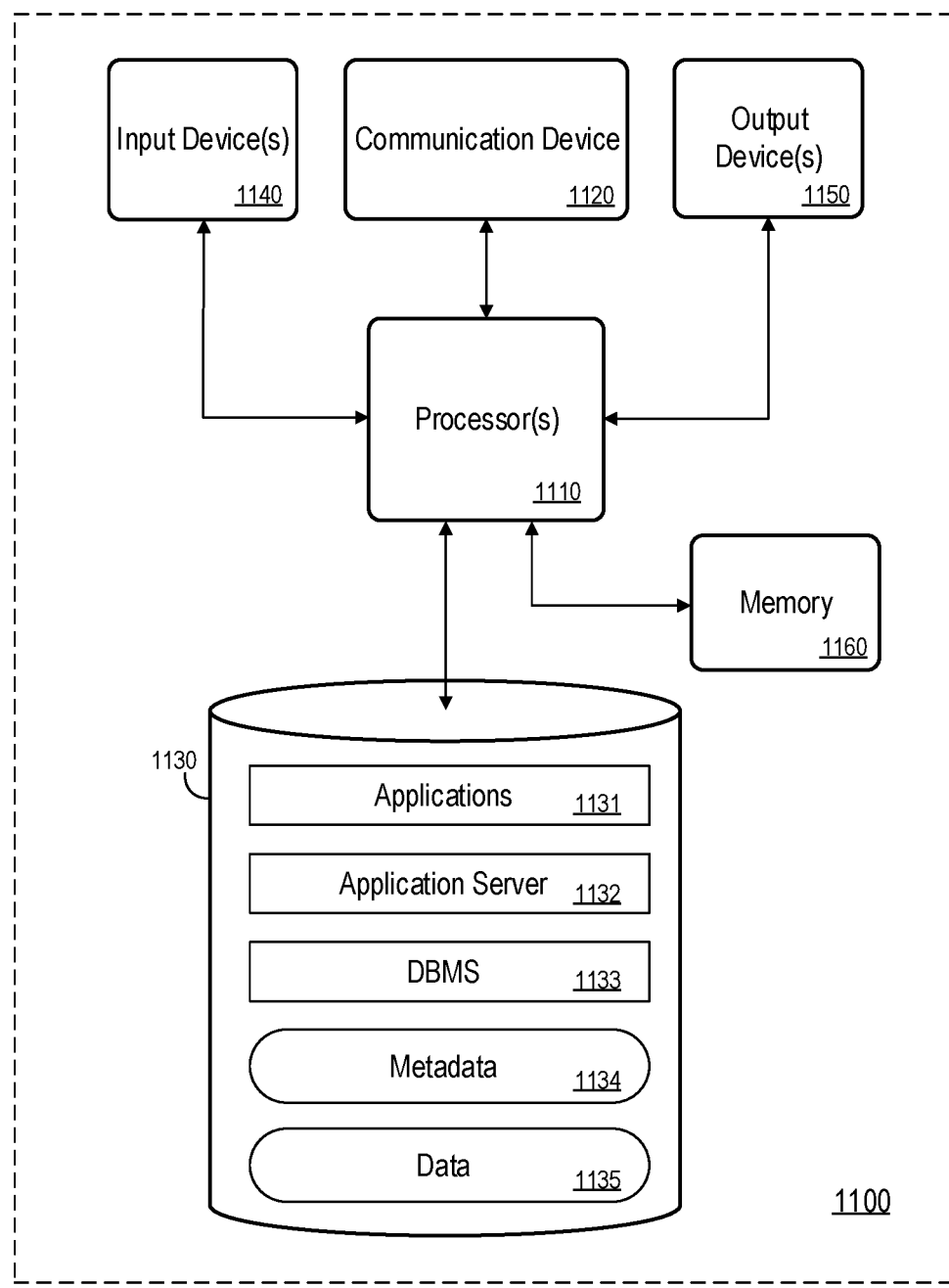
FIG. 11 is a block diagram of an apparatus according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of application server 130, DBMS 120 and data store 110 of FIG. 1 in some embodiments. Apparatus 1100 may include other unshown elements according to some embodiments.

Apparatus 1100 includes processor 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM), Storage Class Memory (SCM) or any other fast-access memory.

Applications 1131, application server 1132 and DBMS 1133 may comprise program code executed by processor 1110 to cause apparatus 1100 to perform any one or more of the processes described herein. Embodiments are not limited to execution of these processes by a single apparatus.

Metadata 1134 and data 1135 (either cached or a full database) may be stored in volatile memory such as memory 1160. Data storage device 1130 may also store data and other program code for providing additional functionality and/or which are necessary for operation of apparatus 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computing system comprising:
a storage device that comprises a queue that stores pending lock requests which have been received from one or more processes and which have not but are waiting to lock onto one or more data objects in a database, where locks on the one or more data objects are currently held by other users of the database; and
a processor configured to
receive a lock request from an application which identifies a target data object of the lock request which is stored in the database,
determine whether the lock request is a new based on whether a matching entry for the lock request currently exists in the queue;
in response to a determination that the lock request is new, determine whether another process holds a lock on the target data object, and in response to at least one other processing holding the lock, identify a queue position for the received lock request based on a priority of the received lock request,
store an entry corresponding to the received lock request among entries of the pending lock requests in the queue at the determined queue position, and
in response to determining to release the queued lock request, dequeue the queued lock request from the queue.

2. The computing system of claim 1, wherein the processor is further configured to return an error notification to the application associated with the lock request when access to the target data object fails.

3. The computing system of claim 1, wherein the queue comprises a queue table which stores an identifier of an application which owns the lock request of the target data object and a lock argument of the lock request.

4. The computing system of claim 3, wherein the lock argument comprises an identifier of the target data object to be locked.

5. The computing system of claim 1, wherein the processor further executes a queue engine which is configured to enqueue and dequeue the pending lock requests from the queue.

6. The computing system of claim 1, wherein the processor is further configured to detect that the queued lock request has expired in response to the queued lock request being pending for greater than a predetermined waiting time and release the queued lock request in response to the detection.

7. The computing system of claim 1, wherein the processor is further configured to shift one or more non-expired lock requests in the queue as a result of the dequeuing of the queued lock request.

8. The computing system of claim 1, wherein the processor is configured to store an identification of a process that currently holds the lock on the target data object at a highest priority entry in the queue.

9. A method comprising:
- implementing, via a storage device, a queue that stores pending lock requests which have been received from one or more processes and which have not but are waiting to access one or more data objects in a database, where locks on the one or more data objects are currently held by other users of the database;
- receiving a lock request from an application which identifies a target data object of the lock request which is stored in the database;
- determining whether the lock request is a new based on whether a matching entry for the lock request currently exists in the queue;
- in response to a determination that the lock request is new, determining whether another process holds a lock on the target data object, and in response to at least one other processing holding the lock, identifying a queue position for the received lock request based on a priority of the received lock request;
- storing an entry corresponding to the received lock request among entries of the pending lock requests in the queue at the determined queue position; and
- in response to determining to release the queued lock request, dequeuing the queued lock request from the queue.

10. The method of claim 9, further comprising returning an error notification to the application associated with the dequeued lock request when access to the target data object fails.

11. The method of claim 9, wherein the queue comprises a queue table which stores an identifier of an application which owns the lock request of the target data object and a lock argument of the lock request.

12. The method of claim 11, wherein the lock argument comprises an identifier of the target data object to be locked.

13. The method of claim 9, further comprising executing a queue engine which is configured to enqueue and dequeue the pending lock requests from the queue.

14. The method of claim 9, further comprising detecting that the queued lock request has expired in response to the queued lock request being pending for greater than a predetermined waiting time and releasing the queued lock request in response to the detection.

15. The method of claim 9, further comprising shifting one or more non-expired lock requests in the queue as a result of the dequeuing of the queued lock request.

16. The method of claim 9, further comprising storing an identification of a process that currently holds the lock on the target data object at a highest priority entry in the queue.

17. A non-transitory computer-readable medium storing instructions which when executed by a processor cause a computer to perform a method comprising:
- implementing, via a storage device, a queue that stores pending lock requests which have been received from one or more processes and which have not but are waiting to access one or more data objects in a database, where locks on the one or more data objects are currently held by other users of the database;
- receiving a lock request from an application which identifies a target data object of the lock request which is stored in the database;
- determining whether the lock request is a new based on whether a matching entry for the lock request currently exists in the queue;
- in response to a determination that the lock request is new, determining whether another process holds a lock on the target data object, and in response to at least one other processing holding the lock, identifying a queue position for the received lock request based on a priority of the received lock request;
- storing an entry corresponding to the received lock request among entries of the pending lock requests at the determined queue position; and
- in response to determining to release the queued lock request, dequeuing the queued lock request from the queue.

18. The non-transitory computer-readable medium of claim 17, wherein the method further comprises returning an error notification to the application associated with the dequeued lock request when access to the target data object fails.

19. The non-transitory computer-readable medium of claim 17, wherein the queue comprises a queue table which stores an identifier of an application which owns the lock request of the target data object and a lock argument of the lock request.

20. The non-transitory computer-readable medium of claim 19, wherein the lock argument comprises an identifier of the target data object to be locked.

* * * * *